United States Patent Office 2,976,926
Patented Mar. 28, 1961

2,976,926
PRODUCTION OF PETROLEUM BY WATER FLOODING

George P. Maly, Fullerton, Calif., assignor to Union Oil Company of California, Los Angeles, Calif., a corporation of California No Drawing. Filed Aug. 19, 1957, Ser. No. 679,109

19 Claims. (Cl. 166—9)

This invention relates to the production of petroleum by secondary recovery methods, and in particular concerns an improved water-flooding process.

Among the various methods presently employed for recovering petroleum from oil-bearing formations which have become depleted to the point where petroleum no longer flows naturally into wells penetrating such formations, the secondary recovery method commonly known as "water-flooding" probably enjoys widest exploitation. In brief, such method consists essentially in pumping water into one or more injection wells under a pressure sufficient to cause the water to flow out through the oil-bearing formation towards one or more other wells which serve as producing wells. Theoretically, as the water flows through the oil-bearing formation the residual oil contained therein is forced ahead of the advancing water front into the producing wells from which it may be pumped to the earth's surface. In many instances, however, this method proves ineffective by reason of the occurrence of strata of high permeability extending between the injection and producing wells. The water chooses the path of least resistance, i.e., the strata of highest permeability, and hence travels from the injection wells to the producing wells in more or less well-defined channels and fails to sweep the residual oil from the formation as a whole. This condition is often aggravated by the fact that the strata of highest permeability are water-bearing or at least water-wet, and their permeabilities are higher with respect to water than to other fluids, particularly petroleum.

For the most part, the various means proposed for alleviating these difficulties have been based on the concept of injecting into the high permeability or "thief" strata a liquid material which is capable of being solidified therein to form a solid water-impermeable plug. However, the solid plugs so formed invariably extend into the strata for only a very short distance, with the result that the aqueous flooding medium soon by-passes the plugs. Moreover, in localities where water-bearing and oil-bearing strata lie so closely adjacent that they cannot be isolated one from the other by packers inserted into the well bore, it is substantially impossible to avoid plugging both types of strata simultaneously, and while the use of selective plugging materials (i.e., plugging materials which are soluble in oil but insoluble in water) has enjoyed some success, the rate at which crude petroleum can dissolve its way through a plug of oil-soluble solid located in a tiny interstice is extremely slow.

It is accordingly an object of the present invention to provide an improved method of recovering petroleum by water-flooding.

Another object is to provide an improved method for plugging subterranean strata throughout a relatively extended portion of their length.

A further object is to provide an improved method for plugging water-bearing strata which lie closely adjacent to oil-bearing strata in a subterranean formation.

Other and related objects will be apparent from the following detailed description of the invention, and various advantages not specifically referred to herein will be apparent to those skilled in the art.

I have found that the above objects and related advantages may be realized through the use of a viscous hydrocarbon oil as a plugging agent. More particularly, I have found that effective plugging of subterranean strata of high permeability can be achieved by injecting into said strata a viscous hydrocarbon oil, e.g., a relatively heavy crude oil. By selecting an oil whose viscosity is suitably correlated to the permeability of the strata encountered, it is possible to inject the oil relatively deeply into said strata, and since the oil is of course a permanent liquid the danger of premature solidification, which is commonly encountered with solidifying-type plugging agents, does not exist. Also, since the oil follows the path of least resistance, it penetrates most deeply into the stratum of highest permeability, less deeply into strata of intermediate permeability, and least deeply into the stratum of lowest permeability. Consequently, upon completion of the oil injection operation, the various strata which comprise the formation subjected to treatment are occupied for a considerable distance out from the well bore by plugs of viscous oil, the length of each plug being directly proportional to the permeability of the stratum into which it has been injected. The oil injection operation thus places the maximum quantity of plug where it is most needed. Upon reversing the pressure gradient on the plugs, i.e., upon releasing the injection pressure and placing the well on production so that the formation pressure tends to force the plugs back out of the strata into the well bore, the opposite effect is achieved; that is, the plugs of shortest length offer the least resistance to flow and hence are forced back out of the strata they occupy more readily than those plugs of longer length. Accordingly, upon putting the well on production, the stratum of lowest permeability is the first to be unplugged and at the lowest back pressure.

The use of a viscous oil plugging agent in accordance with the invention likewise achieves a considerable degree of selectivity. Where a permeable medium is saturated with a liquid of viscosity $V_1$, the efficiency with which that liquid can be displaced by forcing a second liquid of viscosity $V_2$ through the medium is proportional to the ratio $V_2/V_1$. In a normal water-flooding operation, such ratio is substantially 1 in water-bearing strata but is considerably less than 1 in the oil-bearing strata. However, when in accordance with the invention, the water-bearing strata are plugged with a viscous oil the viscosity ratio is considerably less than 1, and the efficiency with which the aqueous flooding medium displaces the liquid from the strata is considerably lowered. Within the oil-bearing strata, however, plugging with a viscous oil does not reduce the ratio $V_2/V_1$ to nearly such a great extent. This arises out of the fact that within the oil-bearing strata the viscous oil plug is diluted with the less viscous connate or indigenous oil, and its viscosity is thus decreased. The net effect of the plugging operation is hence one of greatly increasing the $V_2/V_1$ ratio in the water-bearing strata and of increasing to a much lesser extent the $V_2/V_1$ ratio in the oil-bearing strata. Consequently, the sweeping efficiency of an aqueous flooding medium is much greater in the oil-bearing strata than in the water-bearing strata. This effect is augmented by the fact that, entirely apart from viscosity considerations, the permeability of a permeable medium with respect to a particular liquid with which the medium is saturated is reduced when said medium is saturated with a second liquid of different identity. Thus, the permeability of water-bearing strata with respect to water is considerably lowered by saturating such strata with an oil, whereas the permeability of oil-bearing strata with respect to oil is only very slightly lowered by such saturation.

The process of the invention, in its simplest embodiment, thus consists in introducing a viscous hydrocarbon oil into a production well and applying to the oil sufficient pressure to cause it to move out into the strata which comprise the formation selected for treatment. The pressure is then released and an aqueous flooding medium is introduced into an adjacent injection well and sufficient pressure is applied to said medium to cause it to move out into the formation and flow therethrough towards the production well. By reason of the various factors discussed above, the initial viscous oil injection operation carried out in the production well greatly increases the ease and efficiency with which the aqueous flooding medium sweeps the connate oil through the low permeability strata relative to the ease and efficiency with which the flooding medium passes through the high permeability and/or water-bearing strata.

Considering now the process of the invention in greater detail, the hydrocarbon oil which is employed in the initial treatment of the production well must be miscible with the crude oil which is connate to the formation. Further, it must be immiscible with water. This latter requirement precludes use of the so-called soluble or emulsifiable oils which contain naturally-occurring or added substances which promote emulsification of the oil with connate water. The present process is thus distinguished from those processes which seek to remove water-blocks by injecting into the blocked formation an oil which contains naturally-occurring or added emulsifying agents or surface active agents which promote emulsification or dispersion of the connate water in the injected oil.

As will be apparent from the various considerations previously referred to, the viscosity of the injected oil ($V_i$) must exceed the viscosity of the oil which is indigenous to the formation being treated ($V_c$), i.e., $V_i/V_c$ must exceed unity, and the extent to which certain of the desired results are attained is determined by the extent by which $V_i/V_c$ exceeds unity. On the other hand, the absolute value of $V_i$ must not be so high that the pressure required to force the injected oil deep into the high permeability strata exceeds the capacity of conventional pumping equipment or the fracturing pressure of the formation. Also, in order to attain the advantageous effect caused by dilution of the injected oil by the connate oil, $V_i$ should not exceed $V_c$ by too great an amount. In balancing all of these various factors to the best advantage, I have found that the permanent viscosity of the injected oil should be at least about 20 times the viscosity of the connate oil under the conditions of temperature and pressure existing in the formation subjected to treatment (i.e., the value of $V_i/V_c$ should be at least about 20), but should not exceed about 2000 cps. under said conditions. The term "permanent viscosity" is employed to indicate that the viscosity does not change with passage of time. The oils employed in the practice of the present invention are thus distinguished from the thickened oils which are employed in fracturing operations and which have the property of losing viscosity with the passage of time.

To summarize the foregoing with respect to the nature of the oil which is injected from the production well or wells into the formation selected for treatment, said oil is a hydrocarbon oil which is substantially immiscible with the water connate to said formation. It must further be free for substances which effect solution or dispersion of connate waters in said oil, and must have a permanent viscosity at least about 20, preferably between about 20 and about 1,000, times that of the connate crude petroleum but not greater than about 2000 cps. under the formation conditions.

A wide variety of oils meet the above qualifications, and any of the same may be employed. Since the process of the invention primarily involves physical rather than chemical phenomena, the chemical nature of the oil is of no consequence, i.e., it may be a petroleum oil of paraffinic, asphaltic, or mixed-base nature obtained from western, Mid-Continent, eastern or foreign sources. Crude petroleum is probably the cheapest, although it will be realized that crude oil taken from the same locality or field as that where the process of the invention is carried out will seldom be suitable since such local crude oil will almost invariably have substantially the same viscosity as that of the connate crude oil which is to be recovered. Heavy distillates, including pressure and vacuum distillates, are likewise suitable, as are residua and heavy thermal or catalytically cracked fractions. Such fractions and residua are preferably dewaxed and/or deasphalted prior to use. The injection oil may also be a chemically refined product such as is obtained by adsorption processes, e.g., clay percolation, or by extraction with a selective solvent, e.g., sulfur dioxide, phenol, furfural, etc. In addition to oils of such types whose inherent or natural viscosity meets the stated requirements, there may also be employed oils whose requisite viscosity is due to the presence of dissolved or dispersed additive materials. It must be emphasized, however, that such additive materials must be entirely inert with respect to the connate waters with which the injected oil comes in contact. Thus, suitable viscosity-increasing additives must be water-insoluble and must not be precipitated by or otherwise react with the dissolved metal salts usually contained in connate waters. Also, for reasons previously explained, they must not promote the emulsification or dispersion of the connate water in the injected oil. These requirements dictate that the viscosity-increasing addtives be non-ionic and be substantially free from surface active characteristics. Accordingly, the various thickening or gelling agents which are commonly employed in formulating viscous oils for use in fracturing process are not suitable for use in the present process since such agents are metallic soaps (usually aluminum soaps of fatty acids) which are not only surface-active but are precipitated by the salts usually present in connate water. Furthermore, such agents do not usually effect a permanent increase in the viscosity of the oil. Among the various types of materials which fulfill the above requirements, oil-soluble non-ionic polymers and copolymers are probably the cheapest and most widely available. A preferred class of such polymeric additives comprises natural and synthetic rubbers, particularly the rubberized polymers of isobutylene, copolymers of butadiene and styrene (Buna-S), copolymers of butadiene and acrylonitrile (Buna-N), and copolymers of isobutylene and butadiene ("Butyl" rubber). Also suitable are the Thiokol rubbers, polychloroprene, polystyrene, polybutadiene, polymethylmethacrylate, polyvinyl chloride, and the like. These latter materials are not especially soluble in hydrocarbon oils, but since even small amounts are effective to increase the viscosity of hydrocarbon oils to a high degree, they may be employed to advantage. Any of the various known techniques for preparing hydrocarbon oil solutions or dispersions of such polymeric materials may be employed in preparing viscous compounded oils for use in accordance with the present invention.

The mechanical steps which comprise the present process are for the most part conventional. As previously state, such steps essentially comprise introduction of the injection oil into the bore hole of a production well, and then applying to the oil within the well sufficient pressure to force it out into the formation selected for treatment. When the oil has penetrated to the desired extent the various strata which comprise said formation, the pressure is released and the well is put on water-drive production. Usually, the procedure is effected by packing or plugging off the formation to be treated to isolate it from the remainder of the bore hole, and thereafter filling the bore with a suitable inert fluid, e.g., local crude petroleum. The charge of viscous injection oil is then introduced into the well tubing while displacing the inert fluid from the bore at the top of the well casing. The quantity of viscous oil employed depends upon the thickness and average porosity of the formation being treated and the desired depth of penetration of the viscous oil into the high permeability strata of the formation (preferably at least about ten feet), and can readily be calculated from these factors. After introduction of the required quantity of viscous oil into the well tubing, a suitable pressure-transmitting or driving fluid is forced down the tubing until the charge of viscous oil is opposite the formation. The outlet at the top of the well casing is then closed and pressure is applied to the tubing to force the viscous oil out into the various strata which comprise the formation. Such pressure must not be so high as to fracture the formation since the object of the invention is not one of increasing the average permeability of the formation but one of selectively decreasing the effective permeability of the high permeability and/or water-bearing strata with respect to an aqueous flooding medium. When sufficient of the driving fluid has been forced down the tubing to insure that the viscous oil has been injected to the desired depth, the pressure is then released and the driving fluid is pumped or bailed from the bore, and the well is thereafter placed on water-drive production in the conventional manner. In order to derive greatest benefit from the dilution effect which occurs in the oil-bearing strata, it is usually desirable to hold the injected viscous oil within the formation for at least four hours, and preferably several days, before putting the well back on production.

As will be apparent to those skilled in the well-treating arts, various modifications of the foregoing general method may be employed. Thus, various methods including cementing techniques may be employed to isolate the formation selected for treatment, and the process may be applied to "barefoot" wells. Similarly, through proper location of multiple packers, two or more formations may be isolated and simultaneously or successively injected with the viscous oil. The fluid employed to transmit pressure from the well head to the viscous oil charge may be of the so-called non-penetrating type, e.g., a colloidal suspension of bentonite or starch. If desired, the viscous oil charge may be introduced into the bore by means of a bailer rather than via the tubing or casing. Also, injection of the viscous oil may often advantageously be preceded by the injection into the formation of a relatively light oil, e.g., local crude oil, or a solvent-type fluid such as kerosene or other petroleum distillate. Among other effects, such a pretreatment effects at least a partial solution or dispersion of any waxes, asphalts or the like which may be deposited within the strata which comprise the formation. Other variations are well known in the art, and in general any of the conventional methods for injecting liquids into subterranean formations may be employed in carrying out the present process. The invention lies in the use of a viscous hydrocarbon oil having the properties and in the manner described herein to achieve the stated results rather than in particular manipulative steps.

The following examples will illustrate several ways in which the principle of the invention may be applied, but are not to be construed as limiting the same:

*Example I*

A well which constitutes the production well of a conventional "five-spot" drive is producing 120 bbls./day of 80% water-cut effluent through a slotted liner from a 50-foot producing interval at bottom depth. The well casing is cemented to the walls of the bore immediately above the liner. Core studies indicate that within said producing interval there occur strata varying in permeability from 100 md. to 3000 md. In order to improve production, the water-drive operation is discontinued and the well pump is removed. The well tubing is filled with local crude oil to serve as a driving fluid, the well annulus is closed off, and 100 bbls., of the local crude oil are pumped down the tubing under a pressure of 2500 p.s.i.g. About 300 bbls. of viscous oil are then introduced into the well via the well tubing. The viscous oil employed is a duo-sol refined vacuum distillation fraction of a western crude, and has a viscosity of 100 cps. at the temperature of the producing formation. The connate oil has an in situ viscosity of about 0.3 cps. The charge of viscous oil is followed up with 50 bbls. of local crude oil introduced into the tubing under a pressure of about 1000 p.s.i.g. From the known characteristics of the formation and the well dimensions, it can be calculated that the penetration of the oil into the formation averages about 4 feet. The viscous oil is held within the formation for about 72 hours, after which the pressure is released and the driving fluid and excess viscous oil is bailed out of the well. The well pump is then replaced on the tubing string, and the five-spot drive operation is resumed. After equilibrium conditions have been established, the well produces 95 bbls./day of 30% water-cut effluent. The viscous oil plugging treatment thus effects a 2.7-fold increase in oil production from the well.

*Example II*

In a California well, the producing interval extends between the 3540 and 3680 foot levels and comprises numerous narrow oil-bearing and water-bearing strata. The well is operated as a production well in a water-drive pattern and normally averages about 80 bbls./day of 80% water-cut effluent. Tracing studies indicate that a large proportion of the water produced from the well is the aqueous flooding medium, i.e., the latter is apparently entering the well through one or more high permeability strata and is failing to sweep the oil from the strata of lower permeability. Using standard techniques, the production zone is isolated by means of suitable packers, and 200 bbls. of local crude oil are injected into the isolated formation under a pressure of about 1750 p.s.i.g. The well then is maintained under pressure for about 48 hours, after which 300 bbls. of viscous oil are injected into the formation. The viscous oil is one prepared by dispersing polyisobutylene (molecular weight= 250,000) in a dewaxed lubricating oil fraction with the aid of petroleum ether and acetone as secondary solvents, and thereafter diluting the resulting rubbery dispersion with kerosene. The compounded oil so prepared contains about 1.6 percent by weight of polyisobutylene, and has a viscosity of about 332 cps. at the formation temperature. The in situ viscosity of the connate oil is about 0.4 cps. Upon placing the well back on production, the average rate of production is about 60 bbls./day of 10% water-cut oil.

The invention has been described above primarily as being applied to wells in which the flow of fluids into the well bore is induced by forcing water through the producing formation towards said bore from a water injection well located at some remote point. It should be apparent, however, that the operational prniciples involved are equally applicable in localities where there occurs a natural water drive, i.e., in localities where the formation fluids are driven into the production wells by water of subterranean origin and under naturally developed pressure. The following example illustrates the use of the process of the invention in such a locality.

*Example III*

A well in the San Joaquin valley of California produces about 200 bbls./day of 80% water-cut effluent under a natural water-drive pressure of about 500 p.s.i.g. In order to improve production, there is injected into the producing interval 100 bbls. of a topped crude having a viscosity of about 100 cps. at the formation temperatures; said viscosity value is about 300 times the in situ viscosity of the connate oil. In order to ascertain the fate of the injected oil, the latter is "tagged" with a suitable amount of an oil-soluble radioactive tracer. Upon completion of the injection operation, the well is placed back in production. After equilibrium conditions have become established, the average daily production is about 150 bbls. of 20% water-cut effluent containing an almost negligible amount of the radioactive tracer. A subsequent radioactivity log of the bore indicates that substantially all of the injected oil is held in a single narrow stratum of the producing interval.

Where the formation to be treated in accordance with the invention comprises strata of widely differing permeabilities, e.g., a formation in which there occur strata whose permeabilities vary by a factor of 20 to 100 or more, a very appreciable degree of improvement can be attained by pressuring and depressuring the formation prior to injection of the viscous oil. According to such modification of the invetnion, a suitable fluid is injected under pressure from the well bore into the formation. The applied pressure should be as high as possible without exceeding the fracturing pressure of the formation. If necessary, the well is then held at such pressure until equilibrium conditions are attained, i.e., until the pressure within the various strata which comprise the formation is substantially equalized and is substantially the same in high- and low-permeability strata alike. Usually, however, the injection is at such a low rate that equilibrium conditions are attained substantially continuously. The pressure within the well bore is then quickly reduced, either to the normal well bore pressure or to some intermediate value. Upon such sudden reduction in the well bore pressure, the pressure within the various strata will decline, but the rate at which the pressure drops within any particular stratum is directly proportional to the permeability of that stratum. Consequently, at any given instant within a short time after the pressure is reduced within the well bore, the pressure within any particular stratum is indirectly proportional to the permeability of such stratum, i.e., the strata of highest permeability will be at lowest pressure and the strata of lowest permeability will be at highest presusre. There is thus created within the formation a plurality of zones of different pressure, the number and location of such zones corresponding to the number and location of the strata which comprise the formation and the pressure within each zone being indirectly proportional to the permeability of the strata to which it corresponds. Such condition is of course only of temporary existence since with the passage of time equilibrium conditons will eventually be attained. However, if the viscous oil is injected into the formation while such temporary condition still exists, it will penetrate farthest into the stratum of highest permeability, and least far into the stratum of lowest permeability, thus achieving a greater degree of selectivity than that which is attained when the various strata are at a uniform pressure.

A wide variety of fluids may be employed in initially pressuring the formation. However, it is preferred that such fluid be non-aqueous in order to avoid the possibility of hydrating clays or otherwise damaging the oil-bearing strata. Also, such fluid should be of relatively low viscosity under formation conditions, i.e., it should not be appreciably more viscous than the connate oil. Preferably such fluid is a hydrocarbon oil, e.g., a petroleum distillate, heavy gas condensate, kerosene, light topped crude, etc. Local crude oil is particularly preferred. The amount of fluid which is employed for pre-pressuring the formation is limited by a number of factors, including fracturing pressure of the formation, the permeabilities of the various strata which comprise the same, and the viscosity of the fluid itself. However, any appreciable amount will attain some benefit, although it is preferred to employ enough so that it penetrates into the high permeability strata for a distance of at least about 5 feet.

The following example illustrates practice of the foregoing modification of the invention.

Example IV

A well in the Los Angeles basin area which constitutes the production well of a "five-spot" water drive produces about 290 bbls./day of 97% water-cut crude through a slotted liner from a 65-foot producing interval at bottom depth. The strata which comprise said producing interval vary in permeability from about 100 md. to about 2800 md. In order to improve production, the water-drive operation is discontinued and the well pump is pulled. The tubing is re-inserted down the casing and a retrievable packer is set between the tubing and the casing about 100 feet above the producing interval. A 150-bbl. charge of local crude oil (viscosity=1 cps. at formation conditions) which has previously been produced from the well is then introduced into the well tubing, after which a charge of the same viscous oil as that employed in Example I is pumped down the tubing under a pressure of about 2500 p.s.i.g. Pumping is continued for about 2 hours until the 150-bbl. charge of crude oil has been forced into the formation, whereupon the pumping pressure is reduced to about 1250 p.s.i.g. and pumping is continued at such reduced pressure until about 300 bbls. of the viscous crude has been forced into the formation. Pumping is then stopped and the well is allowed to stand closed in for about 48 hours, after which the well is placed back on production and the water-drive operation is resumed. After equilibrium conditions have become established the well produces 225 bbls./day of 70% water-cut crude.

Other modes of applying the principle of my invention may be employed instead of those explained, change being made as regards the methods or materials employed, provided the step or steps stated by any of the following claims, or the equivalent of such stated step or steps, be employed. In said claims, the stated viscosities are those determined at the temperature of the formation subjected to the defined treatment.

I, therefore, particularly point out and distinctly claim as my invention:

1. The method of producing petroleum from a subterranean petroleum-bearing formation which is penetrated by a well bore, wherein the flow of petroleum into said well bore is caused by the flow of water through said formation towards said well bore, said formation being comprised of closely adjacent strata of different permeabilities, which method comprises introducing into said well bore a hydrocarbon oil having a permanent viscosity at least about 20 times the viscosity of the petroleum connate to said formation but not greater than about 2000 centipoises, said hydrocarbon oil being miscible with said connate petroleum and substantially free from agents which cause emulsification of oil and water; applying to said hydrocarbon oil a pressure sufficient to force the same into said formation but insufficient to fracture said formation; and thereafter releasing said pressure and placing the well on production.

2. The method of producing petroleum from a subterranean petroleum-bearing formation which is penetrated by a well bore, wherein the flow of petroleum into said well bore is caused by the flow of water through said formation towards said well bore, said formation being comprised of closely adjacent strata of different permeabilities, which method comprises positioning a charge of hydrocarbon oil in said well bore opposite said formation and applying to said charge a pressure sufficient to force said charge into said strata but insufficient to fracture said formation, said hydrocarbon oil being miscible with the petroleum connate to said formation and having a viscosity not substantially higher than that of the petroleum connate to said formation; reducing the applied pressure; substantially immediately injecting into said formation at a pressure below the fracturing pressure a second hydrocarbon oil, said second hydrocarbon oil having a permanent viscosity at least about 20 times that of said connate petroleum but not greater than about 2000 centipoises and being miscible with said connate petroleum and substantially free from agents which cause emulsification of oil and water; holding said second hydrocarbon oil within said formation for at least about four hours; and thereafter placing the well on production.

3. The method of producing petroleum from a subterranean petroleum-bearing formation which is penetrated by at least one production well and at least one injection well spaced therefrom, said formation comprising closely adjacent strata of different permeabilities extending between said production and injection wells, which method comprises introducing into at least one of said production wells a hydrocarbon oil having a permanent viscosity at least about 20 times that of the petroleum connate to said formation but not greater than about 2000 centipoises, said hydrocarbon oil being miscible with said connate petroleum and being free from agents which cause the emulsification of oil and water; applying to said hydrocarbon oil a pressure sufficient to force the same into said formation but insufficient to fracture said formation; releasing the applied pressure; introducing an aqueous flooding medium into at least one of said injection wells; and applying sufficient pressure to said flooding medium to cause it to flow through said formation towards said production well.

4. The method of claim 3 wherein said hydrocarbon oil is crude petroleum.

5. The method of claim 3 wherein said hydrocarbon oil is a petroleum distillate solution of a water-insoluble non-ionic polymer.

6. The method of producing petroleum from a subterranean petroleum-bearing formation which is penetrated by at least one production well and at least one injection well spaced therefrom, said formation comprising closely adjacent strata of different permeabilities extending between said production and injection wells, which method comprises introducing into at least one of said production wells a hydrocarbon oil having a permanent viscosity at least about 20 times that of the petroleum connate to said formation but not greater than about 2000 centipoises, said hydrocarbon oil being miscible with said connate petroleum and being free from agents which cause the emulsification of oil and water; applying to said hydrocarbon oil a pressure sufficient to force the same into said formation but insufficient to fracture said formation; holding the said oil within said formation for a period of at least about four hours; releasing the applied pressure; introducing an aqueous flooding medium into at least one of said injection wells; and applying sufficient pressure to said flooding medium to cause it to flow through said formation towards said production well.

7. The method of claim 6 wherein said hydrocarbon oil is crude petroleum.

8. The method of claim 6 wherein said hydrocarbon oil is a petroleum distillate solution of a water-insoluble non-ionic polymer.

9. The method of claim 6 wherein the amount of said hydrocarbon oil employed and the applied pressure are sufficient to force said hydrocarbon oil into said formation for a distance of at least about ten feet.

10. The method of producing petroleum from a subterranean petroleum-bearing formation which is penetrated by at least one production well and at least one injection well spaced therefrom, said formation comprising closely adjacent strata of different permeabilities extending between said production and injection wells, which method comprises introducing into at least one of said production wells a first hydrocarbon oil the viscosity of which is not substantially higher than that of the petroleum connate to said formation; applying to said hydrocarbon oil a pressure sufficient to force the same into said formation but insufficient to fracture said formation; reducing the applied pressure; substantially immediately injecting into said formation under said reduced pressure a second hydrocarbon oil having a permanent viscosity at least about 20 times that of said connate petroleum but not greater than about 2000 centipoises and being miscible with said connate petroleum and free from agents which cause emulsification of oil and water; releasing the applied pressure; introducing an aqueous flooding medium into at least one of said injection wells; and applying to said aqueous flooding medium sufficient pressure to cause it to flow through said formation toward said production well.

11. The method of claim 10 wherein the said first hydrocarbon oil is crude petroleum.

12. The method of claim 10 wherein the said second hydrocarbon oil is crude petroleum.

13. The method of claim 10 wherein the said second hydrocarbon oil is a petroleum distillate solution of a water-insoluble non-ionic polymer.

14. The method of producing petroleum from a subterranean petroleum-producing formation which is penetrated by at least one production well and at least one injection well spaced therefrom, said formation comprising closely adjacent strata of different permeabilities extending between said production and injection wells, which method comprises (1) introducing into at least one of said production wells a charge of a first hydrocarbon oil having a viscosity not substantially greater than that of the petroleum connate to said formation; (2) introducing into said well above said charge of first hydrocarbon oil a charge of a second hydrocarbon oil having a permanent viscosity at least about 20 times that of said connate petroleum but not greater than about 2000 centipoises and being miscible with said connate petroleum and free from agents which cause emulsification of oil and water; (3) applying to said charge of second hydrocarbon oil a pressure sufficient to force said charge of first hydrocarbon oil into said formation but insufficient to fracture said formation; (4) continuing the application of said pressure until substantially all of said charge of first hydrocarbon oil is forced into said formation; (5) reducing the applied pressure to a value substantially below that applied in Step (3) but sufficient to force said second hydrocarbon oil into said formation; (6) continuing the application of pressure at said reduced value until a substantial amount of said second hydrocarbon oil is forced into said formation; (7) holding the said second hydrocarbon oil within said formation for a period of at least about four hours; (8) releasing the applied pressure ; (9) introducing an aqueous flooding medium into at least one of said injection wells; and (10) applying to said aqueous flooding medium sufficient pressure to cause it to flow through said formation towards said production well.

15. The method of claim 14 wherein the said first hydrocarbon oil is crude petroleum.

16. The method of claim 14 wherein the said second hydrocarbon oil is crude petroleum.

17. The method of claim 14 wherein the said second hydrocarbon oil is a petroleum distillate solution of a water-insoluble non-ionic polymer.

18. The method of claim 14 wherein the said first hydrocarbon oil is crude petroleum which has previously been produced from said formation and said second hydrocarbon oil is a petroleum distillate solution of a rubber-like hydrocarbon polymer.

19. The method of claim 14 wherein the amount of said second hydrocarbon oil employed and the pressure applied thereto in Step (6) are sufficient to force said second hydrocarbon oil into said formation for a distance of at least about ten feet.

References Cited in the file of this patent

UNITED STATES PATENTS

| | | |
|---|---|---|
| 2,681,704 | Menaul | June 22, 1954 |
| 2,771,138 | Beeson | Nov. 20, 1956 |
| 2,799,341 | Maly | July 16, 1957 |
| 2,800,184 | Meadors | July 23, 1957 |
| 2,864,448 | Bond et al. | Dec. 16, 1958 |
| 2,876,840 | Berry | Mar. 10, 1959 |